United States Patent

Sylvander et al.

[15] 3,649,818
[45] Mar. 14, 1972

[54] GROUNDSPEED AND TIME-TO-GO COMPUTER

[72] Inventors: Frederick B. Sylvander, Rutherford; Richard L. Cohen, Old Bridge; Murray Putzer, West Caldwell, all of N.J.

[73] Assignee: The Bendix Corporation

[22] Filed: Dec. 17, 1969

[21] Appl. No.: 885,779

[52] U.S. Cl. ..................235/150.27, 73/178 R, 235/150.2, 324/178
[51] Int. Cl. .......................................................G06d 15/32
[58] Field of Search ....................235/150.27, 151.32, 150.2; 324/160, 178; 73/178 R

[56] References Cited

UNITED STATES PATENTS 3,530,382  9/1970  Liston et al. ............................324/178

Primary Examiner—Malcolm A. Morrison
Assistant Examiner—R. Stephen Dildine, Jr.
Attorney—Anthony F. Cuoco and Plante, Arens, Hartz, Smith and Thompson

[57] ABSTRACT

A groundspeed and time-to-go computer for an aircraft. The groundspeed computation is implemented by counting the pulses from a fixed frequency pulse generator during an interval established by the units transmitter of distance-measuring equipment (DME), and which interval is inversely proportional to groundspeed. The time-to-go computation is implemented by counting down the count from units, tens and hundreds DME transmitters until zero is reached and noting the interval.

6 Claims, 3 Drawing Figures

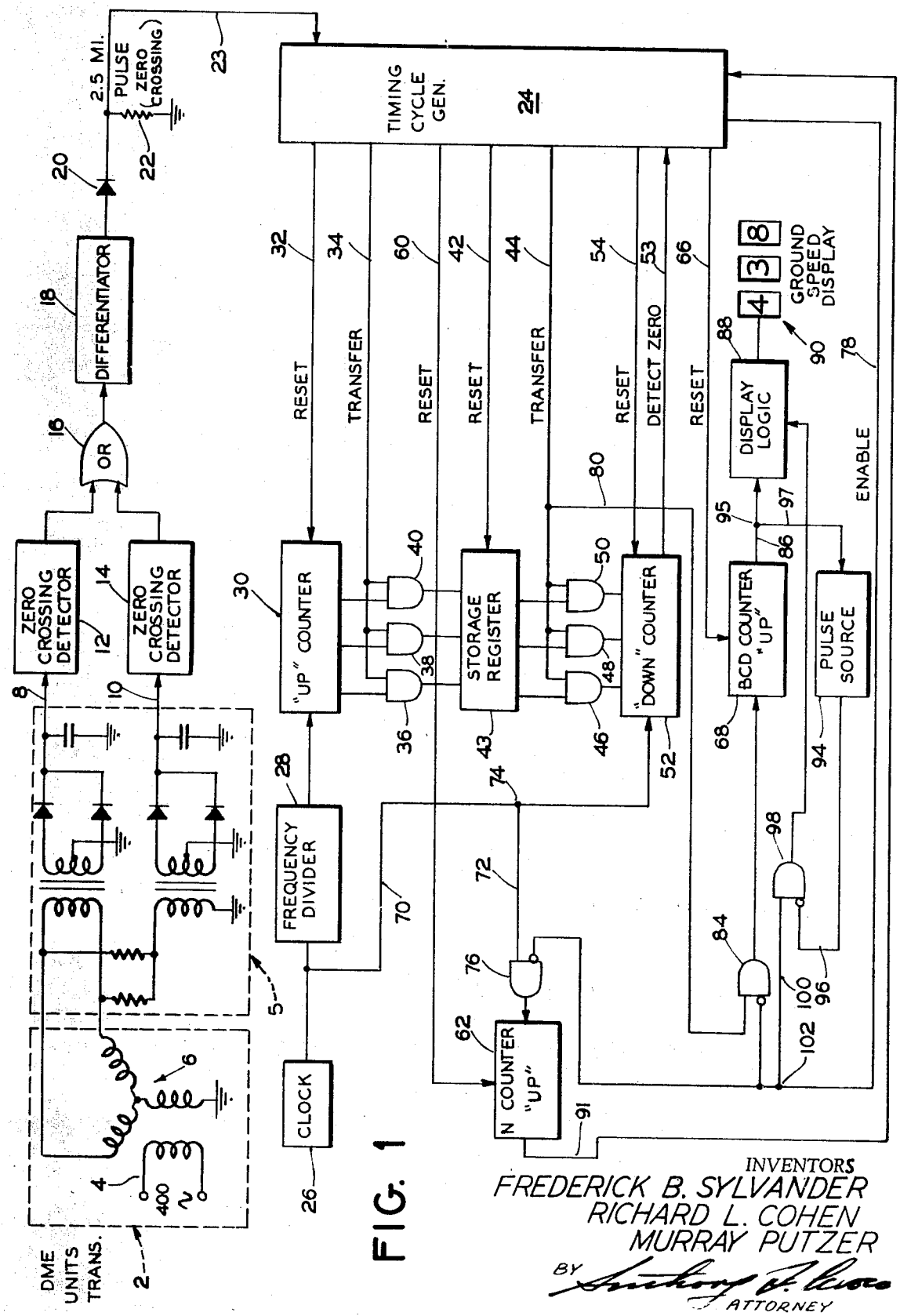

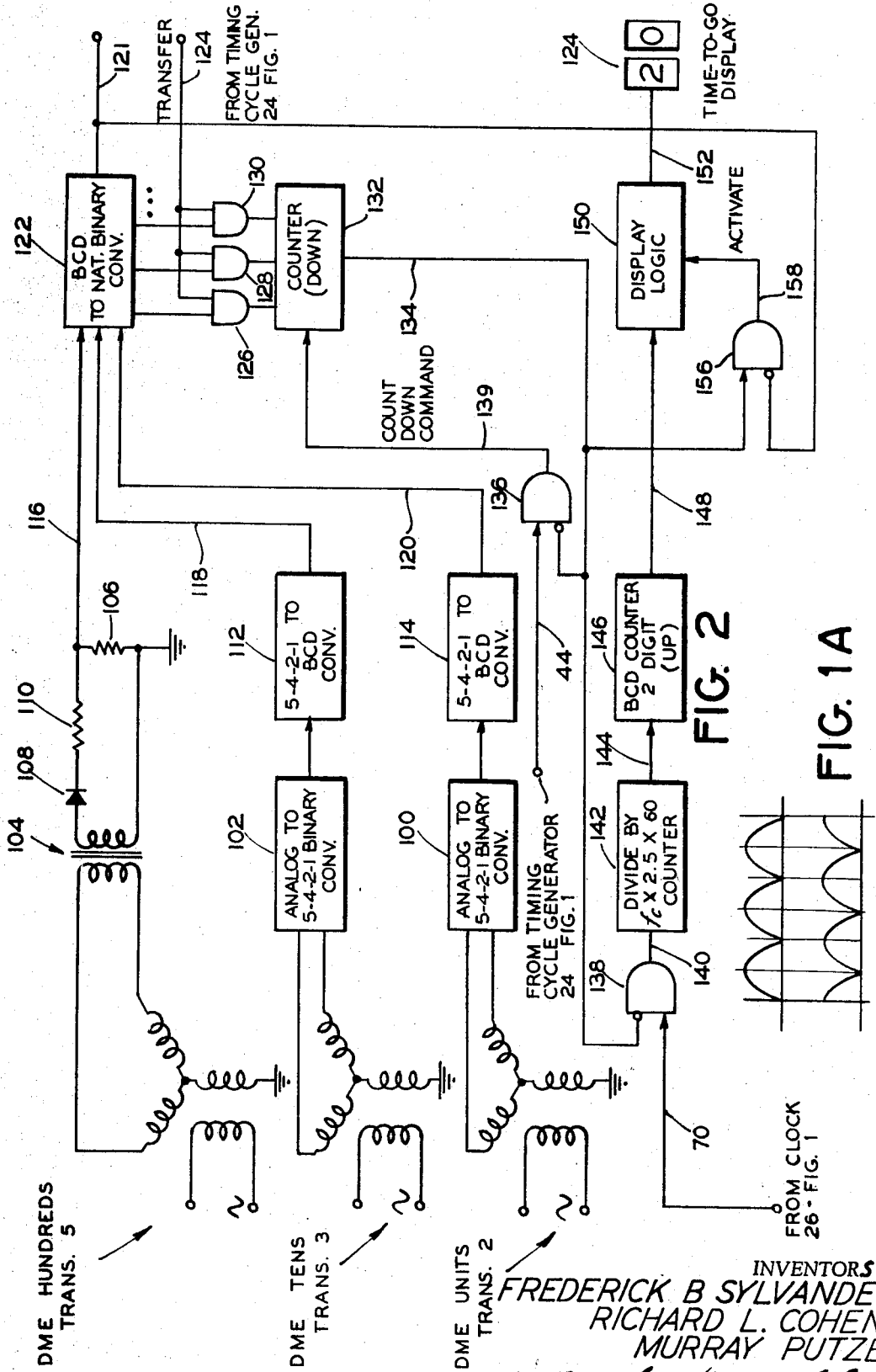

GROUNDSPEED AND TIME-TO-GO COMPUTER

BACKGROUND OF THE INVENTION

This invention relates to apparatus for computing aircraft groundspeed and time-to-go from DME inputs and, more particularly, to digital apparatus for computing same.

DESCRIPTION OF THE PRIOR ART

Prior to the present invention devices of the type described employed electromechanical apparatus, reference being had to U.S. Pat. No. 3,443,073 granted to Richard L. Cohen and assigned to The Bendix Corporation, assignee of the present invention. These devices include moving parts subject to wear and tear and untimely failure, thus affecting the reliability of the system. Moreover, these devices are bulky so as to consume valuable weight and space in aircraft. The device of the invention overcomes these difficulties and provides useful digital readouts of aircraft groundspeed and time-to-go to the DME station.

SUMMARY OF THE INVENTION

This invention contemplates digital apparatus for computing and displaying groundspeed and time-to-go to a designated DME station and uses information from units, tens and hundreds DME transmitters. The units transmitter rotates at an angular rate directly proportional to groundspeed and the equivalent distance per revolution corresponds to a predetermined distance (10 miles). The time duration per angular increment of rotation is inversely proportional to groundspeed. A counter is arranged to count pulses from a fixed frequency clock and the number of pulses accumulated by the counter over a fixed increment of rotation of the units transmitter is inversely proportional to groundspeed. A proportionality factor "N" is selected to read groundspeed in, for example, nautical miles per hour, and which factor is equal to the product of the count and groundspeed. The count from the counter is emptied into an accumulator for as many cycles as required, with the number of cycles occurring being counted by another counter until the accumulator content reaches proportionality factor "N," whereupon the number of cycles corresponds to groundspeed in nautical miles.

Distance-to-go information from the units, tens and hundreds DME transmitters is converted to a binary format and transferred to a down counter which counts down the distance-to-go until zero. The time duration between two adjacent count pulses is set by the number of pulses from the fixed frequency clock accumulated over the fixed increment of rotation of the units transmitter. The result is divided by a constant so that the time-to-go is read directly in minutes.

One object of this invention is to use DME data for computing aircraft groundspeed and time-to-go to the DME station.

Another object of this invention is to use digital means for computing same.

Another object of this invention is to display the computed parameters.

Another object of this invention is to compute groundspeed by counting pulses from a fixed frequency pulse generator during an interval established by the DME units transmitter, and which interval is inversely proportional to groundspeed.

Another object of this invention is to compute time-to-go to the DME station by counting down the count from DME units, tens and hundreds transmitters until zero is reached and noting the interval.

Another object of this invention is to update the aforenoted computations at predetermined increments of distance traveled.

Another object of this invention is to impart memory to the computer for holding the groundspeed display at its last computed value when the distance from the DME station is less than a predetermined minimum.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

FIG. 1 is a block diagram of apparatus for computing and displaying groundspeed in accordance with the invention.

FIG. 1A is a graphical representation showing waveforms of zero crossing voltages provided in accordance with the invention.

FIG. 2 is a block diagram of apparatus for computing and displaying time-to-go in accordance with the invention.

With reference to FIG. 1, there is shown a units transmitter 2 of conventional TACAN distance-measuring equipment (DME), and which units transmitter 2 includes a rotor 4 energized by a suitable source of 400-cycle AC voltage and a stator 6 inductively coupled to rotor 4 for providing outputs varying as the sine and cosine of the rotor angular displacement. The operation of the distance-measuring equipment of a TACAN system is well known in the art and the TACAN system itself may be of the type described in an article "Principles of TACAN," by R. I. Cohen and S. H. Dodington, in Electrical Communication, volume 33, pages 11–25, Mar. 1956, published by the International Telephone and Telegraph Corporation, New York, New York. Units transmitter 2 is fully described in the aforenoted U.S. Pat. No. 3,443,073 and it will suffice to say for purposes of the present invention that units transmitter 2 is used in conjunction with a tens transmitter and a hundreds transmitter to be hereinafter referred to for providing in accordance with the invention a computation and display of time-to-go to a DME station and the groundspeed of an aircraft as will now be explained.

Units transmitter 2 is connected to conventional transforming and rectifying apparatus designated generally by the numeral 5. This apparatus is responsive to the sine and cosine functions of the units transmitter output to provide zero crossing outputs at output conductors 8 and 10 thereof, and which outputs have waveforms as shown in FIG. 1A. It will be seen from FIG. 1A that every 90° one of the outputs at conductors 8 and 10 is at zero. It is to be further noted that units transmitter 2 may be of the type wherein the equivalent distance per revolution of rotor 4 thereof is the aforenoted 10 nautical miles so that each time zero voltage occurs the equivalent distance traveled by the aircraft is 2.5 miles.

A zero crossing detector 12 and a zero crossing detector 14 are connected through an OR-gate 16 to a differentiator 18 so that when a zero output occurs at either conductor 8 or 10, gate 16 provides an output which is applied to the differentiator. The output from differentiator 18 is applied through a diode 20 for passing outputs of a predetermined polarity and through a voltage-dividing resistor 22 and a conductor 23 to a timing cycle generator 24. The output at conductor 23 enables timing cycle generator 24 so that the generator provides appropriate pulses for controlling the system.

It is to be noted that timing cycle generator 24 provides outputs which may be divided into two categories. Outputs in the first category are pulses and conditions to start a computation once every 2.5 miles i.e., when the sine and cosine voltages from units transmitter 2 are at zero. Outputs in the second category are pulses and conditions to perform the computations. The characteristics of the first category are therefore fixed from cycle to cycle while the characteristics of the second category vary from cycle to cycle depending on input data.

A fixed frequency clock 26 provides pulses at a predetermined frequency, and which pulses are applied through a frequency divider 28 to an "up" counter 30. When timing cycle generator 24 receives a pulse through conductor 23, a reset pulse is provided at an output conductor 32 of the timing cycle generator, and which pulse resets counter 30 to zero for the counter to start counting the pulses from clock 26 applied through frequency divider 28.

When a pulse is next applied through conductor 23, timing cycle generator 24 provides a transfer pulse at an output conductor 34, and which transfer pulse enables gates 36, 38 and 40 to transfer the output from counter 30 to a multistage storage register 43. Just prior to providing the transfer pulse at output conductor 34, timing cycle generator 24 provides a reset pulse at an output conductor 42, and which reset pulse resets storage register 43 for receiving the data to be transferred from counter 30.

It will now be understood that the time interval per angular increment of rotation of rotor 4 of units transmitter 2 is inversely proportional to groundspeed. Since counter 30 counts fixed frequency pulses from clock 26 applied through frequency divider 28, the number of pulses accumulated by counter 30 over a fixed increment of rotation of rotor 4 is inversely proportional to groundspeed. A proportionality factor may therefore be selected to scale the count to read groundspeed in nautical miles per hour (knots). This constant, designated as "N," is equal to the product of the count and groundspeed, and groundspeed may be obtained by successively emptying the count from counter 30 into an accumulator for as many cycles as required, with the number of cycles being counted until the accumulator content reaches an amount equal to constant "N."

In accordance with the above, whenever a pulse is applied through conductor 23, a transfer pulse is provided at an output conductor 44 of timing cycle generator 24 for enabling gates 46, 48 and 50 to transfer the output from storage register 43 to a "down" counter 52. Just prior to providing the transfer pulse at output conductor 44, timing cycle generator 24 provides at an output conductor 54 a pulse for resetting counter 52 for receiving data transferred from storage register 43.

When a pulse is applied through output conductor 23, timing cycle generator 24 provides at an output conductor 60 a pulse for resetting an "up" counter 62, and also provides at an output conductor 66 a pulse for resetting a binary coded decimal (BCD) "up" counter 68. The pulses from clock 26 are applied through a conductor 70 to "down" counter 52 and are applied through a conductor 72 joining conductor 70 at a point 74 to a gate 76. When counter 52 has counted down to zero a "detect zero" pulse is provided at a conductor 53 and is applied therethrough to timing cycle generator 24. The timing cycle generator then provides at an output conductor 78 an "enable" pulse, and which pulse is applied through conductor 78 to gate 76. When gate 76 receives the aforenoted pulses through conductors 72 and 78, it provides a pulse for enabling counter 62, and which counter 62 thereupon counts up until the proportionality factor N is attained.

The pulse from timing cycle generator 24 at output conductor 44 thereof is applied through a conductor 80 joining conductor 44 at a point 82 to a gate 84. The enable pulse at output conductor 78 of timing cycle generator 24 is applied through conductor 78 to gate 84, and when gate 84 receives the outputs through conductors 78 and 80 it applies an output to counter 68. Counter 68 thereupon counts the number of times that storage register 43 empties into counter 52 and provides at an output conductor 86 a pulse corresponding thereto. This pulse is applied through conductor 86 to display logic 88 and therefrom to a groundspeed display indicator 90 for digitally displaying groundspeed. When counter 62 reaches the proportionality factor N, it provides a pulse at an output conductor 91, and which pulse is applied through conductor 91 to timing cycle generator 24 for disabling the generator.

When the distance-to-go to the DME station is equal to or less than 20 nautical miles, a pulse source 94 is triggered by the pulse from BCD counter 68, applied through a conductor 97 joining conductor 86 at a point 95, and provides a pulse at an output conductor 96. This pulse is applied through conductor 96 to a gate 98. There is also applied to gate 98 the enable pulse from timing cycle generator 24, and which enable pulse is applied to gate 98 through a conductor 100 joining conductor 78 at a point 102. When gate 98 detects the pulses at conductors 96 and 100, it provides a pulse for locking display logic apparatus 88, thereby imparting memory to the system.

With reference to FIG. 2, wherein apparatus for implementing the time-to-go computation is illustrated, there is shown a DME units transmitter 2, a DME tens transmitter 3 and a DME hundreds transmitter 5. Tens transmitter 3 and hundreds transmitter 5 are similar in all respects to units transmitter 2 previously described.

Units transmitter 2 is connected to an analog to 5-4-2-1 binary converter 100 and tens transmitter 3 is connected to a similar analog to 5-4-2-1 binary converter 102. Hundreds transmitter 5 is connected through apparatus including a transformer 104, a diode 108, a resistor 110 and a resistor 106 for providing an analog output having "high" and "low" logic levels as will now be understood.

Converter 102 is connected to a 5-4-2-1 binary coded decimal converter 112 and converter 100 is connected to a 5-4-2-1 binary coded decimal converter 114. Logic pulses are provided at output conductors 116, 118 and 120 in response to the outputs from hundreds transmitter 5, tens transmitter 3 and units transmitter 2, respectively.

Output conductors 116, 118 and 120 are connected to a BCD to natural binary converter 122. When a pulse is applied through conductor 23 to timing cycle generator 24 shown in FIG. 1, the timing cycle generator provides a transfer pulse at an output conductor 124 and which transfer pulse is applied through the conductor 124 to gates 126, 128 and 130. When gates 126, 128 and 130 receive the transfer pulse, the output from converter 122 is transferred to a "down" counter 132. When counter 132 counts down to zero, a pulse is provided at an output conductor 134 thereof, and which output is applied through conductor 134 to a gate 136 and to a gate 138.

The transfer pulse at output conductor 44 of timing cycle generator 24, provided as described with reference to FIG. 1, is applied to gate 136, and when gate 136 receives pulses through conductors 44 and 134 it provides at an output conductor 139 a countdown command pulse, and which command pulse is applied through conductor 139 to counter 132. When gate 138 receives the pulse at conductors 134 of counter 132 and further receives a pulse from clock 26 through conductor 70 shown in FIG. 1, it provides an output at an output conductor 140 which is applied to a "divide" counter 142. Counter 142 divides the output of gate 138 by an appropriate constant so that a readout in minutes may be obtained and provides a corresponding output at an output conductor 144. The output at conductor 144 is applied to a binary coded decimal "up" counter 146 and the output from counter 146 at an output conductor 148 is applied to time-to-go logic display means 150. The time-to-go logic display means 150 provides at an output conductor 152 an output which drives time-to-go display apparatus 154 for digitally displaying time-to-go to the DME station.

The output at output conductor 134 of counter 132 is applied to a gate 156 as is the output from converter 122. When gate 152 receives the outputs from counter 132 and from converter 122 it provides a pulse at an output conductor 158 for activating logic display apparatus 150.

As heretofore noted with reference to the groundspeed computation shown in FIG. 1, when the distance to the DME station is less than 20 nautical miles as indicated by converter 122, an output is provided at an output conductor 121 of converter 122 for engaging locking apparatus similar to that described with reference to FIG. 1, and whereby a mechanism is operated for dropping a flag in front of the time-to-go display.

SUMMATION

In computing groundspeed it is noted that units transmitter 2 is continuously rotating at an angular speed that is directly proportional to the groundspeed of the aircraft. The time duration per angular increment of rotation of rotor 4 is inversely proportional to groundspeed. Therefore, counter 30 is arranged to count fixed frequency pulses provided by clock 26 and applied through frequency divider 28. The number of pulses accumulated by the counter over a fixed increment of rotation of rotor 6 is inversely proportional to groundspeed. Proportionality factor N is selected to scale the count from the counter to read groundspeed in nautical miles per hour. The proportionality factor is equal to the product of the count and the groundspeed. Groundspeed is therefore obtained by successively emptying the count into counter 52 for as many cycles as is required, with the number of cycles occurring being counted by counter 68 until the content of counter 52 reaches proportionality factor N. The system is then disabled and the number of count cycles is recorded as groundspeed, with groundspeed being digitally displayed by display means 90.

The time-to-go to the DME station is computed from distance-to-go information obtained from units transmitter 2, tens transmitter 3, and hundreds transmitter 5. The outputs from the transmitters are converted to a natural binary format by converter 122 and transferred to counter 132. The transfer is accomplished as a function of the distance travelled per revolution of units transmitter 2, as described in relation to the groundspeed computation. The computation is performed when counter 132 counts down the data from converter 122 until zero is reached. When this occurs the time duration between adjacent count pulses is established by the number of pulses from clock 26 accumulated over the fixed increment of rotation of units transmitter 2. For time-to-go to be read directly in minutes, it is adjusted by a proportionality constant accomplished through divider 142.

The information used in the aforementioned computations is updated every 2.5 nautical miles. The instant of updating occurs at the zero crossing of the sine and cosine outputs from units transmitter 2.

The DME receiver involved provides the slant distance from the aircraft to a station. The rate of change of this distance is slant velocity, and is approximately equal to the groundspeed of the aircraft for large distances. It will now be understood that the "apparent" groundspeed drops to zero when the aircraft passes over the station. Memory apparatus including pulse source 96 and gate 98 is triggered whenever the slant distance to the station is less than 20 miles. The memory circuit causes the groundspeed to remain at its last computed position until the aircraft is 20 miles beyond the station at which time the system will again be updated. A warning flag will obscure the time-to-go display when the system is in the memory mode.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for aircraft, comprising:
   distance measuring means for measuring distance of the aircraft from a station;
   clock means for providing fixed frequency pulses;
   first counting means connected to the distance-measuring means and to the clock means for counting the fixed frequency pulses between increments established by the distance-measuring means;
   an accumulator;
   first gating means connecting the counter to the accumulator and connected to the distance-measuring means and operative at the increments established by the distance-measuring means for initiating cycles to transfer the count from the counter to the accumulator;
   second counting means connected to the accumulator for counting the number of transfer cycles until the accumulator content reaches a predetermined constant, and for thereupon providing an output;
   converting means connected to the distance-measuring means for converting the distance measured thereby to natural binary outputs;
   third counting means;
   second gating means connecting the converter to the third counting means and connected to the distance-measuring means, and operative at the increments established by the distance-measuring means for transferring the outputs from the converting means to the third counting means;
   command means connected to the distance-measuring means, the clock and the third counting means, and responsive to pulses from the clock accumulated between the increments established by the distance-measuring means for commanding the third counting means to count down and to provide a controlling output upon reaching zero; and
   display means connected to the second counting means and to the last-mentioned means and responsive to the outputs therefrom for providing displays of aircraft groundspeed and time-to-go to the station, respectively.

2. Apparatus as described by claim 1, wherein the distance-measuring means includes:
   units, tens and hundreds transmitters;
   the first counting means, the first gating means, the second gating means and the command means connected to the units transmitter; and
   the converting means connected to the units, tens and hundreds transmitters.

3. Apparatus as described by claim 2, wherein:
   the units, tens and hundreds transmitters each include an angularly displaceable rotor energized by a voltage source and a stator inductively coupled to the rotor for providing outputs varying as the sine and cosine of the rotor angular displacement.

4. Apparatus as described by claim 3, including:
   means connected to the stator for detecting when one of the sine and cosine outputs are at zero and for thereupon providing an output; and
   means connected to the last-mentioned means and responsive to the output therefrom for providing a controlling output.

5. Apparatus as described by claim 4, including:
   signal-generating means connected to the last-mentioned means and responsive to the controlling output therefrom for providing a plurality of output pulses in a predetermined timing sequence;
   the first counting means connected to the signal generating means so as to be reset by one of the pulses therefrom to count the fixed frequency pulses from the clock;
   the first gating means connected to the signal generator and responsive to another of the pulses therefrom for transferring the count from the counter to the accumulator; and
   the second gating means connected to the signal generator and responsive to still another of the pulses therefrom for transferring the outputs from the converting means to the third counting means.

6. Apparatus as described by claim 1, including:
   a pulse source connected to the second counting means and responsive to an output therefrom when the distance to he station is less than a predetermined minimum for providing an output pulse;
   means for providing a system enabling output; and
   a gate connected to the pulse source and to the enabling means and responsive to the outputs therefrom for providing a controlling output; and
   the display means connected to the gate and responsive to the controlling output therefrom for being locked to in-part memory to the apparatus.

* * * * *